United States Patent
Ward et al.

(10) Patent No.: US 10,158,558 B1
(45) Date of Patent: Dec. 18, 2018

(54) SEGMENT ROUTING OF PACKETS ACCORDING TO A MULTICAST DISTRIBUTION TREE IN A NETWORK

(71) Applicant: Cisco Technology, Inc., San Jose, CA (US)

(72) Inventors: David Delano Ward, Somerset, WI (US); Clarence Filsfils, Brussels (BE); Muthurajah Sivabalan, Kanata (CA); Stefano Benedetto Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/410,730

(22) Filed: Jan. 19, 2017

(51) Int. Cl.
*H04L 12/28* (2006.01)
*H04L 12/761* (2013.01)
*H04L 12/753* (2013.01)

(52) U.S. Cl.
CPC .............. *H04L 45/16* (2013.01); *H04L 45/48* (2013.01)

(58) Field of Classification Search
CPC ......... H04L 45/34; H04L 45/48; H04L 45/72; H04L 49/201
USPC .................................. 370/390, 408, 422, 475
See application file for complete search history.

(56) References Cited

U.S. PATENT DOCUMENTS

| | | | |
|---|---|---|---|
| 5,570,466 A * | 10/1996 | Oechsle | H04L 45/04 370/401 |
| 9,049,233 B2 | 6/2015 | Frost et al. | |
| 9,369,549 B2 * | 6/2016 | Allan | H04L 45/66 |
| 9,450,829 B2 | 9/2016 | Filsfils et al. | |
| 9,450,864 B2 * | 9/2016 | Zhao | H04L 45/42 |
| 9,485,150 B2 | 11/2016 | Filsfils et al. | |
| 9,813,333 B2 * | 11/2017 | Zhao | H04L 45/50 |
| 2014/0269699 A1 | 9/2014 | Filsfils et al. | |
| 2017/0033939 A1 * | 2/2017 | Bragg | H04L 12/18 |
| 2017/0149692 A1 * | 5/2017 | Allan | H04L 49/201 |

OTHER PUBLICATIONS

Vasseur et al., "Path Computation Element (PCE) Communication Protocol (PCEP)," RFC 5440, Mar. 2009, The Internet Society, Reston, VA, USA (eighty-seven pages).

(Continued)

*Primary Examiner* — Dmitry Levitan
(74) *Attorney, Agent, or Firm* — The Law Office of Kirk D. Williams (57) ABSTRACT

In one embodiment, packets are forwarded in a network according to a Segment Routing-based (SR-based) multicast distribution tree identified by a Tree Segment Identifier (Tree-SID). This packet forwarding includes packet replication to cause multiple copies of a same packet to be forwarded to different nodes of the SR-based multicast distribution tree. The Tree-SID is typically a same global value used within the network to identify the SR-based multicast distribution tree. As each packet is being routed through the network according to the SR-based multicast distribution tree, the packet includes the Tree-SID in a Segment List of the packet, with the Segment List being an ordered list of SID's identifying information for forwarding the packet in the network. The Tree-SID provides a lookup key for efficient forwarding of packets by packet switching devices making forwarding decisions, which may including forwarding multiple copies of the packet.

16 Claims, 8 Drawing Sheets

(56) References Cited

OTHER PUBLICATIONS

Gredler et al., "North-Bound Distribution of Link-State and Traffic Engineering (TE) Information Using BGP," RFC 7752, Mar. 2016, The Internet Society, Reston, VA, USA (forty-eight pages).

Filsfils et al., "Segment Routing Architecture," draft-ietf-spring-segment-routing-09, Jul. 4, 2016, The Internet Society, Reston, VA, USA (twenty-nine pages).

Filsfils et al., "Segment Routing with MPLS data plane," draft-ietf-spring-segment-routing-mpls-04, Mar. 18, 2016, The Internet Society, Reston, VA, USA (fifteen pages).

"Introduction to Segment Routing," Cisco ASR 9000 Series Aggregation Services Router Segment Routing Configuration Guide, May 19, 2016, Cisco Systems, Inc., San Jose, CA, USA (six pages).

"Introduction to Segment Routing," Segment Routing Configuration Guide, Cisco IOS XE Release 35, Dec. 21, 2015, Cisco Systems, Inc., San Jose, CA, USA (nine pages).

Previdi et al., "IPv6 Segment Routing Header (SRH)," draft-ietf-6man-segment-routing-header-04, Jan. 18, 2017, The Internet Society, Reston, VA, USA (twenty-eight pages).

Deering and Hinden, "Internet Protocol, Version 6 (IPv6) Specification," RFC 2460, Dec. 1998, The Internet Society, Reston, VA, USA (thirty-nine pages).

\* cited by examiner

SEGMENT ROUTING OF PACKETS ACCORDING TO A MULTICAST DISTRIBUTION TREE IN A NETWORK

TECHNICAL FIELD

The present disclosure relates generally to forwarding of packets in a network, by packet switching devices, including packet switching devices Segment Routing of packets according to a multicast distribution tree.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. One form of packet switching is Segment Routing (SR), which leverages the source routing paradigm. Packet switching devices forward packets following an ordered set of instructions, called segments, in a Segment List in a Segment Routing header of the packet.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with Segment Routing of packets according to a multicast distribution tree in a network. One embodiment includes a method, comprising:

sending a plurality of packets in a network along a Segment Routing-based (SR-based) multicast distribution tree identified by a particular Tree Segment Identifier (Tree-SID) with the particular Tree-SID being a same global value used within the network to identify the SR-based multicast distribution tree, with each particular packet of the plurality of packets including the particular Tree-SID in a Segment List of said particular packet, with the Segment List comprising an ordered list of SID's identifying information for forwarding said particular packet in the network.

In one embodiment, said sending the plurality of packets includes: a first network node receiving a first packet of the plurality of packets; and the first network node multicasting the first packet based on the particular Tree-SID located in the Segment List of the first packet, with said multicasting including forwarding the first packet from the first network node to a plurality of other network nodes in the network according to the SR-based multicast distribution tree.

2. Description

Disclosed are, inter alia, methods, apparatus, computer-storage media, mechanisms, and means associated with Segment Routing of packets according to a multicast distribution tree in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for perfoiming methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value - the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1:
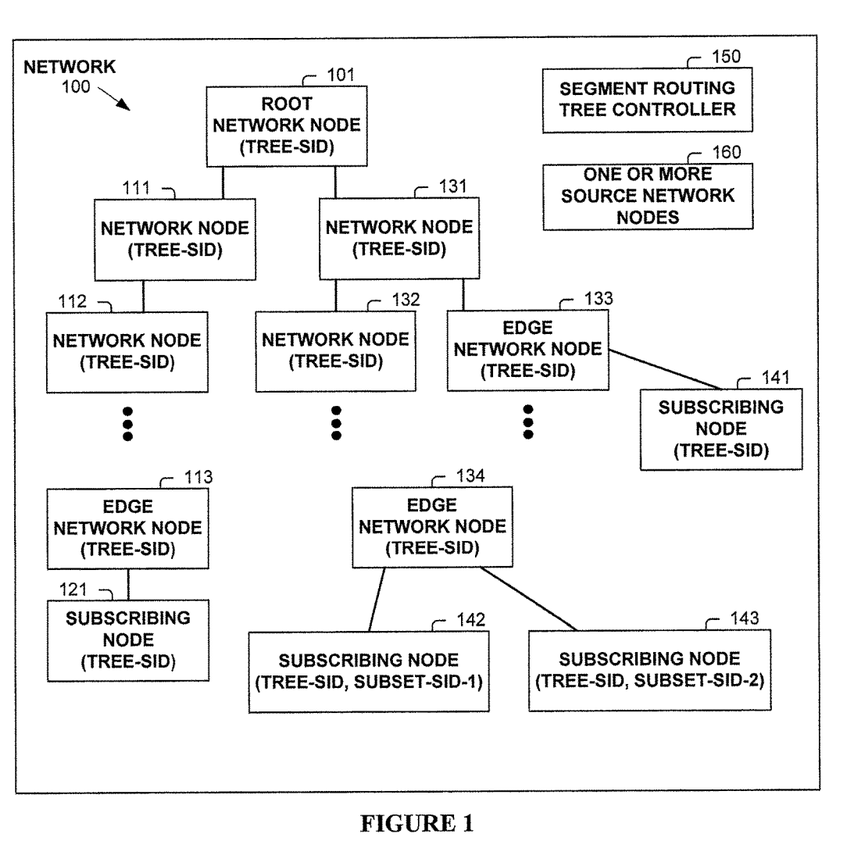
FIG. 1 illustrates a network operating according to one embodiment.

FIG. 1 illustrates a network 100 operating according to one embodiment. As shown from a logical connection perspective, network 100 includes network nodes 101, 111-113, 131-134, subscribing nodes 121, 141-143, a Segment Routing tree controller 150, and one or more source network nodes 160. In one embodiment, multiple Segment Routing tree controllers 150 are used for load balancing and backup protection.

In one embodiment, Segment Routing tree controller 150 maintains network topology information, such as, but not limited to using Border Gateway Protocol (BGP) Link State protocol (BGP-LS) to obtain network connectivity information and Path Computation Element (PCE) Communication Protocol (PCEP) to collect information about configured tunnels and other network-related information. Segment Routing tree controller 150 uses its maintained topology information to compute Segment Routing-based (SR-based) multicast distribution trees, and programs network nodes 101, 111-113, 131-134 to forward packets accordingly to reach subscribing nodes 121, 141-143. A particular SR-based multicast distribution tree is typically represented by a unique Tree Segment Identifier (Tree-SID), which has global significance and/or at least to each of network nodes 101, 111-113, 131-134. A particular Tree-SID is then included in a Segment List of a packet forwarded through the SR-based multicast distribution tree, with network nodes 101, 111-113, 131-134 making forwarding (including packet replication to provide the multicast aspect) decisions based on the Tree-SID.

In one embodiment, Segment Routing tree controller 150 has available to it an exclusive label space from which a unique Tree Segment Identifier (Tree-SID) is selected. In one embodiment, Segment Routing tree controller 150 queries other network nodes (e.g., at least to each of network nodes 101, 111-113, 131-134) to acquire and/or ensure that labels within this label space are exclusive for the Segment Routing tree controller 150 to use without conflict.

In one embodiment, a source network node 160 or another network node will request the creation of a SR-based multicast distribution tree by sending a message to the Segment Routing tree controller 150. In one embodiment, such a request includes some or all of the following information: an alphanumeric name of the tree, the Tree-SID, the root node 101, destination nodes (e.g., edge network nodes 101, 111-113, 131-134 and/or subscribing nodes 121, 141-143), and design criteria. In one embodiment, the Tree-SID is generated by the Segment Routing tree controller 150. In one embodiment, the root node is automatically selected by the Segment Routing tree controller 150 based on the location of the source network node 160 and the destination nodes. In one embodiment, the design criteria specifies characteristics (e.g., optimization/quality of service objectives, constraints) of the SR-based multicast distribution tree to be provided and/or avoided, such as, but not limited to, link rates (e.g., 2 GBPS minimum), specific links or network nodes to use or avoid (e.g., path and Shared Risk Link/Node Group disjointness), other Service-Level Agreement (SLA) criteria, fault tolerant information, optimization objective (e.g., minimize link cost or latency), etc.

In one embodiment, Segment Routing tree controller 150 computes the SR-based multicast distribution tree and programs network nodes 101, 111-113, 131-134 accordingly. In one embodiment, Segment Routing tree controller 150 uses extensions to PCEP and/or other network configuration protocols in programming network nodes 101, 111-113, 131-134. In one embodiment, Segment Routing tree controller 150 uses extensions to BGP-LS for communicating information about SR-based multicast distribution trees. In one embodiment, the ingress interface(s) on which a packet to be communicated through the network 100 according to the SR-based multicast distribution tree is received is programmed such that the Tree-SID can be a lookup key to identify one or more egress interfaces from which to send the packet. These egress interfaces are also programmed such that the Tree-SID can be a lookup key to identify information for forwarding the packet from these one or more egress interfaces. In one embodiment, Segment Routing tree controller 150 adjusts the SR-based multicast distribution tree according to topology changes in network 100. In one embodiment, Segment Routing tree controller 150 signals network nodes 101, 111-113, 131-134 to remove their corresponding programming in response to removing the SR-based multicast distribution tree from network 100.

As illustrated in FIG. 1, a source network node 160 does not have to be directly connected to root node 101. Rather, source network node 160 can simply send packets with particular Tree-SID identifying information to root network node 101, with root network node then forwarding these packets through the SR-based multicast distribution tree identified by the particular Tree-SID. In one embodiment, each packet received by root node 101 includes the particular Tree-SID in the Segment List of the packet. In one embodiment, a Segment value included in a received packet is used to identify the particular Tree-SID by root node 101. In one embodiment, an address or other value in a received packet is used to identify the particular Tree-SID by root node 101.

As shown in FIG. 1, root node 101 will forward packets through the SR-based multicast distribution tree including network nodes 101, 111-113, 131-134, which will each make forwarding (including packet replication to provide the multicast aspect) decisions based on the particular Tree-SID. In one embodiment, each packet including the particular Tree-SID is forwarded through network nodes 101, 111-113, 131-134 with the packet (typically with the Segment Routing header removed) forwarded to subscribing nodes 121 and 141-143. In one embodiment, a Tree-SID can be used to communicate multiple subsets of packets, with edge nodes 112, 133, 134 filtering non-subscribed to subsets of channels. In one embodiment, a Subset-SID identifier in the Segment List of a packet is used to distinguish between subsets of packets. In one embodiment, another value is used to distinguish between subsets of packets.

Figure 2A:
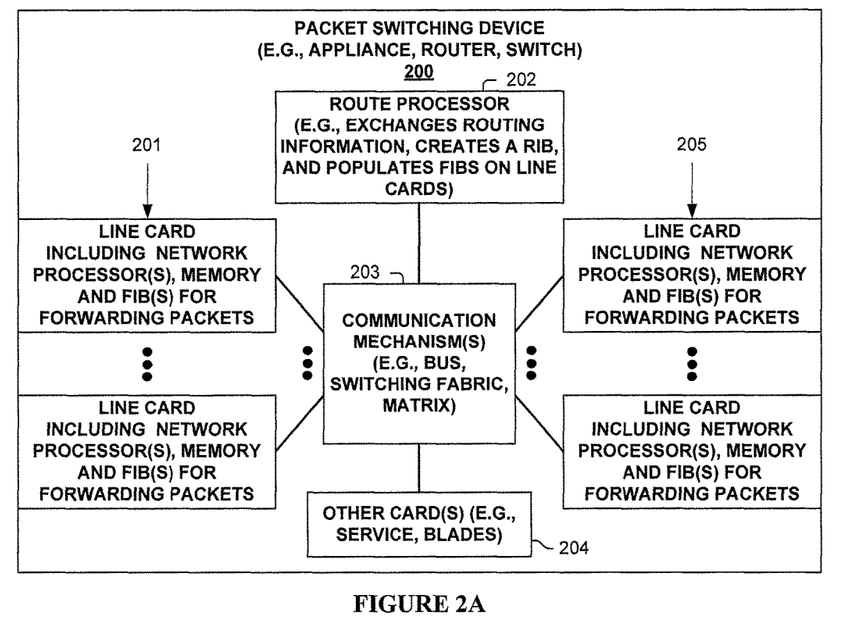
FIG. 2A illustrates a packet switching device according to one embodiment.
Figure 2B:
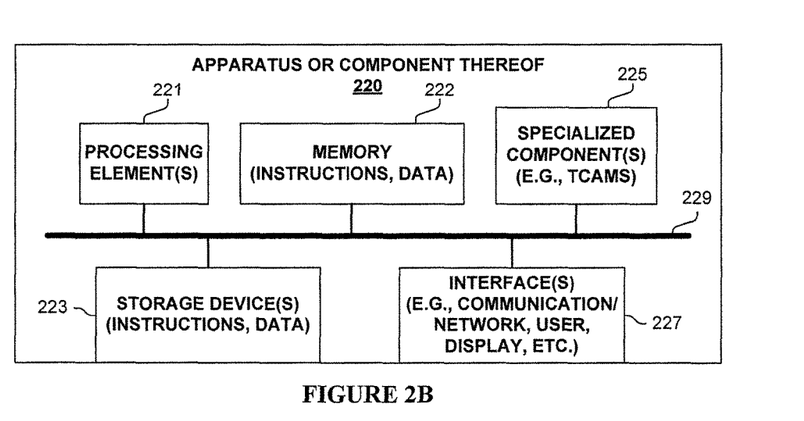
FIG. 2B illustrates an apparatus according to one embodiment.

FIGS. 2A-B and their discussion herein are intended to provide a description of various exemplary packet switching systems used according to one embodiment. One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with Segment Routing of packets according to a multicast distribution tree in a network. Packet switching device 200 also has a control plane with one or more processing elements 202 for managing the control plane and/or control plane processing of packets associated with Segment Routing of packets according to a multicast distribution tree in a network. Packet switching device 200 also includes other cards 204 (e.g., service cards, blades) which include processing elements that are used in one embodiment to process packets associated with Segment Routing of packets according to a multicast distribution tree in a network, and some communication mechanism 203 (e.g., bus, switching fabric, and/or matrix, etc.) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 use a tie-breaking selection ordering of manipulated ingress point identifiers in determining which packets/cells to send before other packets/cells having a same timestamp.

FIG. 2B is a block diagram of an apparatus 220 used in one embodiment associated with Segment Routing of packets according to a multicast distribution tree in a network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222, storage device(s) 223, specialized component(s) 225 (e.g. optimized hardware such as for performing lookup and/or packet processing operations, performing multiple lookup and/or other operations in parallel, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
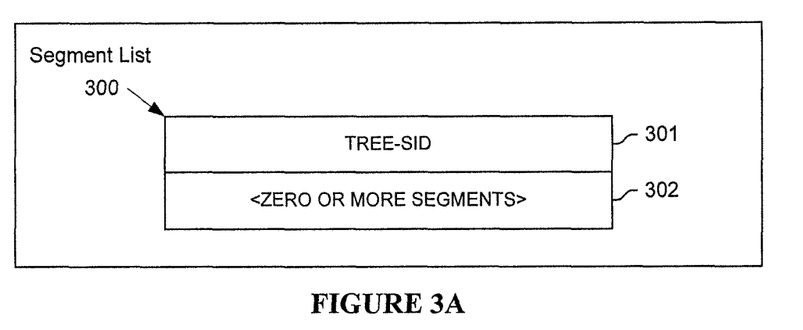
FIG. 3A illustrates a Segment List according to one embodiment.

FIG. 3A illustrates a Segment List 300 of a packet sent through a SR-based multicast distribution tree according to one embodiment. As shown Segment List 300 includes the Tree-SID 301, and zero or more other Segments 302.

Figure 3B:
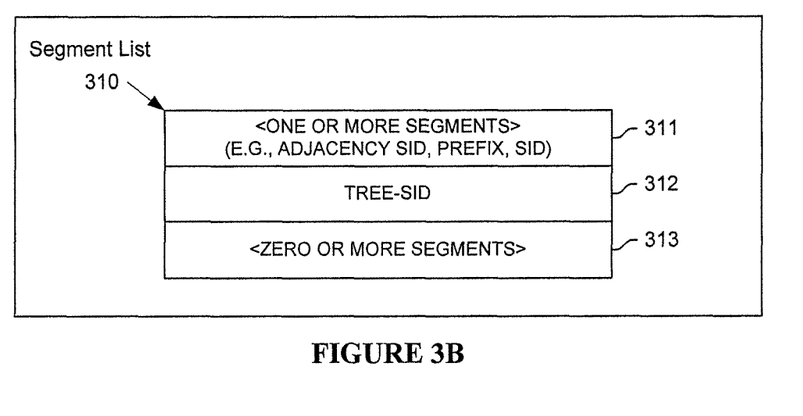
FIG. 3B illustrates a Segment List according to one embodiment.

FIG. 3B illustrates a Segment List 310 of a packet sent through a SR-based multicast distribution tree and/or sent from a source node to the root node of the SR-based multicast distribution tree according to one embodiment. As shown Segment List 310 includes one or more Segments (e.g., Adjacency SID, Prefix SID) 311, Tree-SID 312, and zero or more other Segments 313. In one embodiment, a source node includes a Prefix SID as Segment 311 of a packet to reach the root node of the SR-based multicast distribution tree, with the Tree-SID 312 subsequently used to forward the packet through the network according to the SR-based multicast distribution tree.

Figure 3C:
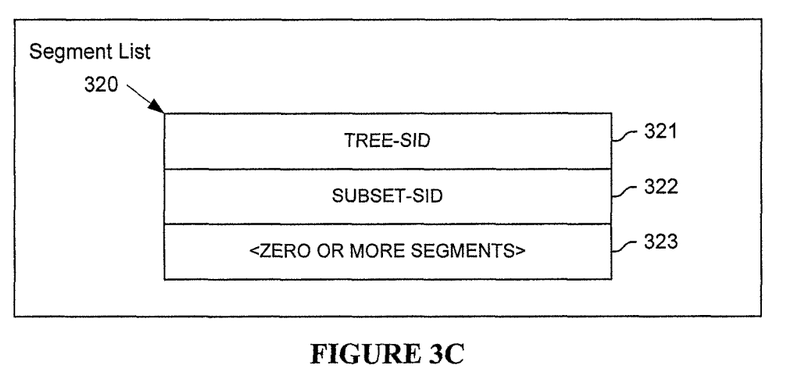
FIG. 3C illustrates a Segment List according to one embodiment.

FIG. 3C illustrates a Segment List 320 of a packet sent through a SR-based multicast distribution tree according to one embodiment. As shown Segment List 320 includes the Tree-SID 321, a Subset-SID 322, and zero or more other Segments 323. Tree-SID 321 is used in forwarding the packet through the network according to the SR-based multicast distribution tree, with Subset-SID 322 used by edge nodes of the SR-based multicast distribution tree to determine to which subscriber(s) (if any) to forward the packet. In one embodiment, a root node advertises the Tree-SID as one of its Prefix SIDs so that Segment List 320 can also be used in communicating a packet from a source node to the root node.

Figure 3D:
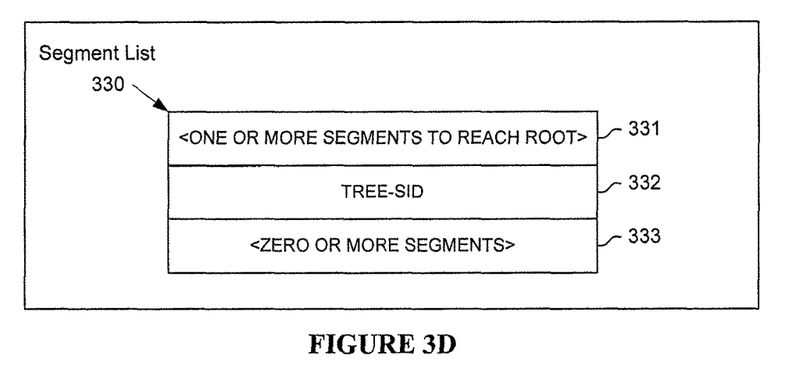
FIG. 3D illustrates a Segment List according to one embodiment.

FIG. 3D illustrates a Segment List 330 of a packet sent from a source node to the root node of the SR-based multicast distribution tree according to one embodiment. As shown Segment List 330 includes one or more Segments (e.g., Adjacency SID, Prefix SID) 331, Tree-SID 332, and zero or more other Segments 333. In one embodiment, a source node includes a Prefix SID or one or more Adjacency SIDs as Segment(s) 331 of a packet to reach the root node of the SR-based multicast distribution tree, with the Tree-SID 332 subsequently used to forward the packet through the network according to the SR-based multicast distribution tree.

Figure 3E:
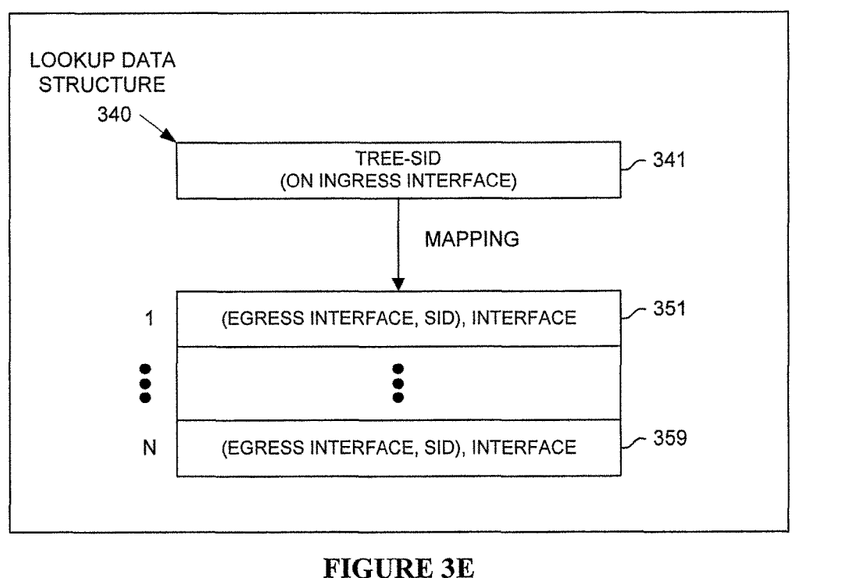
FIG. 3E illustrates a data structure according to one embodiment.

FIG. 3E illustrates a data structure 340 according to one embodiment. Each ingress interface of a packet switching device on which a packet with a particular Tree-SID 341 can be received is programmed in a data structure 340 to map the Tree-SID 341 to one of more egress interfaces 351-359. After a packet is received, a lookup operation is performed in data structure 340 based on its Tree-SID to identify one or more egress interfaces 351-359, to each of which a copy of the received packet is sent. Thus, if there are multiple egress interfaces 351-359 identified, packet replication (i.e., multicasting) occurs.

Figure 3F:
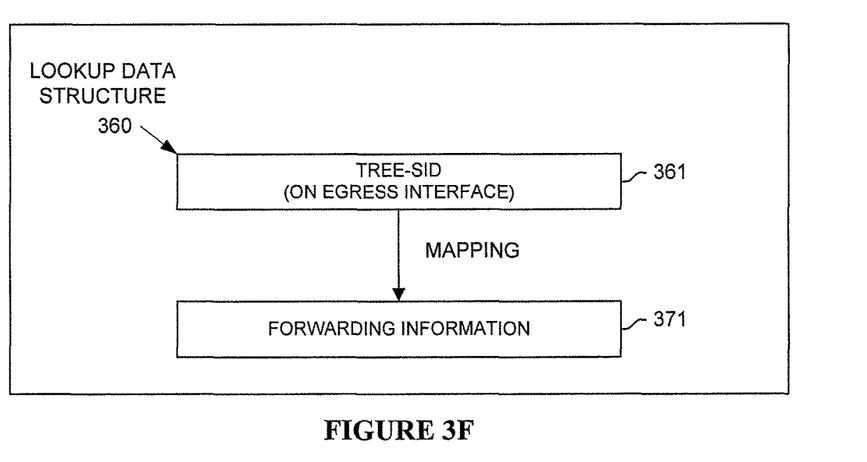
FIG. 3F illustrates a data structure according to one embodiment.

FIG. 3F illustrates a data structure 360 according to one embodiment. Each egress interface of a packet switching device on which a packet with a particular Tree-SID 361 is received is programmed in a data structure 360 to map the Tree-SID 361 to corresponding forwarding information 371 for forwarding the packet from the egress interface.

Figure 4:
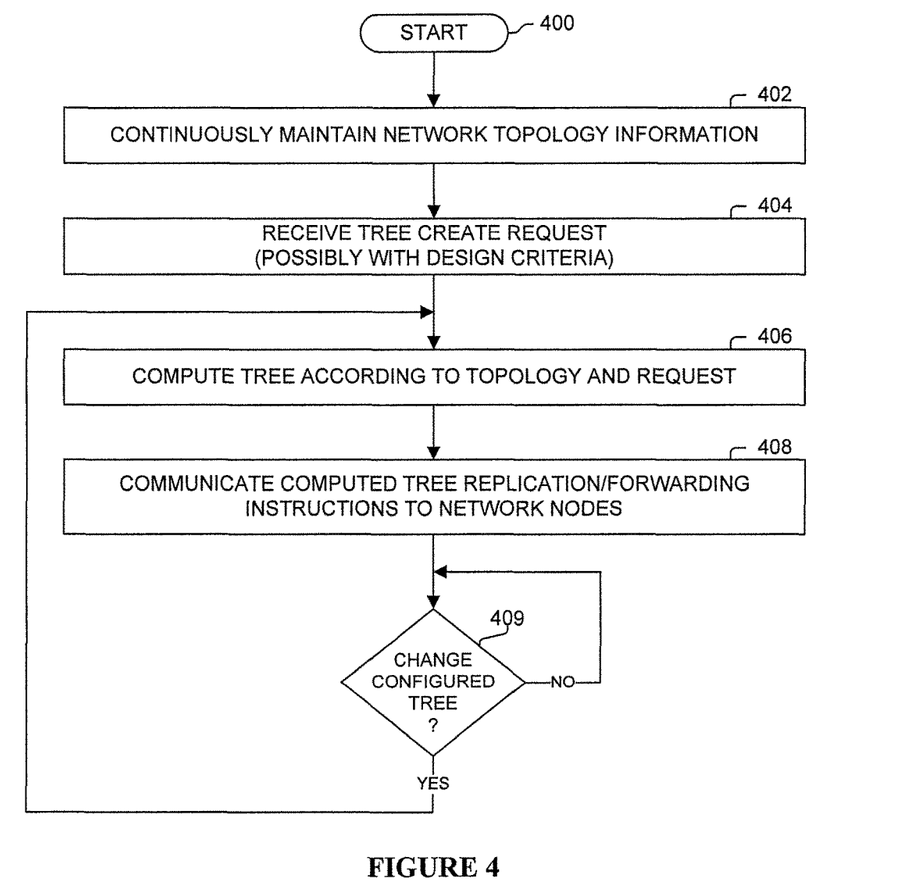
FIG. 4 illustrates a process according to one embodiment.

FIG. 4 illustrates a process performed by a Segment Routing tree controller according to one embodiment. Processing begins with process block 400. In process block 402, the Segment Routing tree controller continuously maintains network topology information using various protocols, including, but not limited to BGP-LS and PCEP. In process block 404, a request (possibly including design criteria) to create a SR-based multicast distribution tree is received. In process block 406, the tree is computed according to the maintained topology information and the received request. In process block 408, forwarding instructions (including packet replication instructions where appropriate) are provided to the nodes of the network that form the SR-based multicast distribution tree. As determined in process block 409, when the SR-based multicast distribution tree's topology needs to be changed (e.g., based on a change of network topology or a received modification request such as to add more edge nodes), processing returns to process block 406.

Figure 5A:
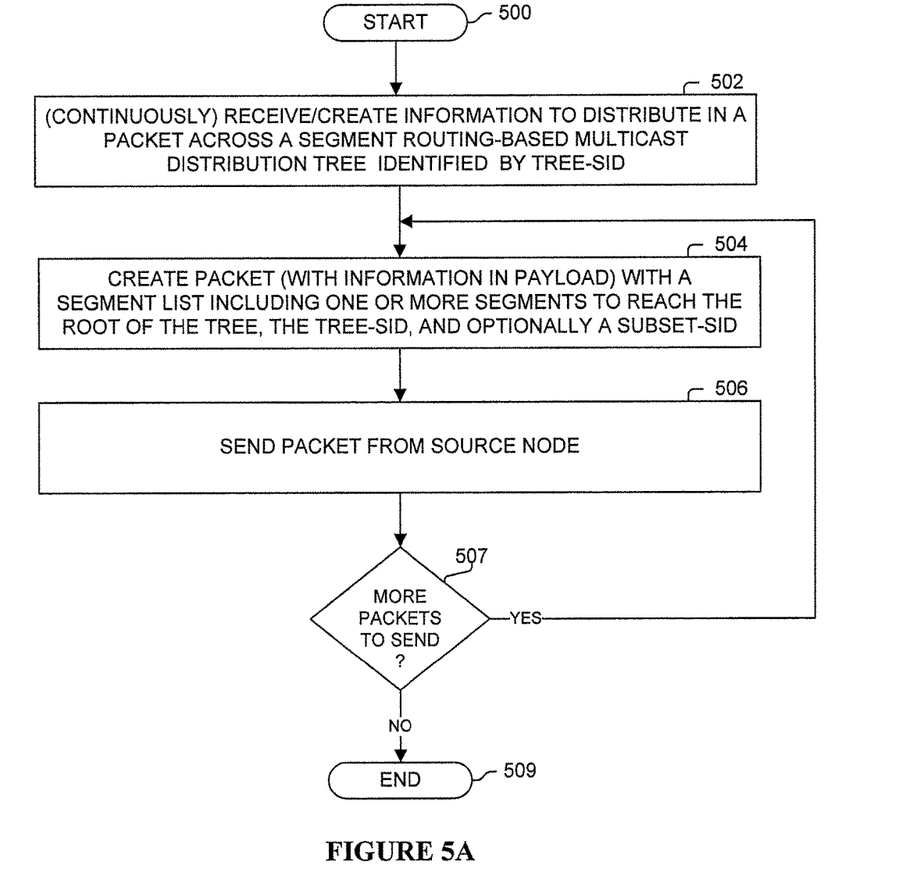
FIG. 5A illustrates a process according to one embodiment.

FIG. 5A illustrates a process performed by a source node according to one embodiment. Processing begins with process block 500. In process block 502, the source node continuously receives or creates information to be distributed in a particular SR-based multicast distribution tree identified by a particular Tree-SID. In process block 504, a packet is created, with the packet including some of this information in its payload as well as including a Segment List having one or more Segments for reaching the root node of the SR-based multicast distribution tree as well as the Tree-SID, and optionally a Subset-SID. In process block 506, the packet is sent from the source node to the root node. As determined in process block 507, if there are more packets to send, then processing returns to process block 504; else processing of the flow diagram of FIG. 5A is complete as represented by process block 509.

Figure 5B:
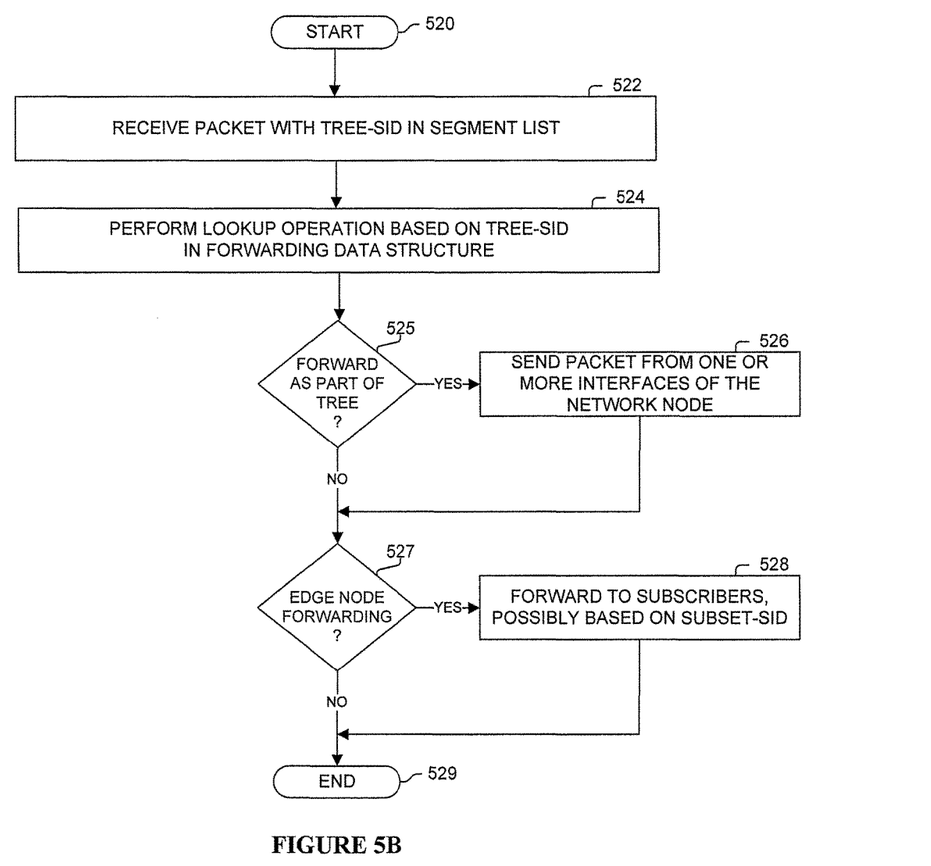
FIG. 5B illustrates a process according to one embodiment.

FIG. 5B illustrates a process performed by a network node that is part of a SR-based multicast distribution tree according to one embodiment. Processing begins with process block 520. In process block 522, a packet is received with the Tree-SID in its Segment List. In process block 524, a lookup operation is performed on the Tree-SID in a forwarding data structure to determine how to forward the packet, including possibly replicating the packet.

As determined in process block 525, if the packet is to be forwarded to another network node in the SR-based multicast distribution tree, then in process block 526, the packet is forwarded from one or more interfaces of the network node. Processing proceeds to process block 527.

As determined in process block 527, if the packet is to be forwarded to a subscribing node, then in process block 528, the packet is forwarded to one or more subscribers, possibly based on a Subset-SID.

Processing of the flow diagram of FIG. 5B is complete as indicated by process block 529.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
sending a plurality of packets in a network along a Segment Routing-based (SR-based) multicast distribution tree identified by a particular Tree Segment Identifier (Tree-SD) with the particular Tree-SID being a same global value used within the network to identify the SR-based multicast distribution tree, with each particular packet of the plurality of packets including the particular Tree-SID in a Segment List of said particular packet, with the Segment List comprising an ordered list of one or more SID's identifying information for forwarding said particular packet in the network, and with said sending the plurality of packets comprising:
a first network node receiving a first packet of the plurality of packets; and
the first network node multicasting the first packet based on the particular Tree-SID located in the Segment List of the first packet, with said multicasting including forwarding the first packet from the first network node to a plurality of other network nodes in the network according to the SR-based multicast distribution tree;
wherein the plurality of packets includes a first plurality of packets and a second plurality of packets, with each of the first plurality of packets including a first Subset-SID in the Segment List of each packet of the first plurality of packets, and with each of the second plurality of packets including a second Subset-SD in the Segment List of each packet of the second plurality of packets; wherein with the first Subset-SID identifies that a corresponding packet is in the first plurality of packets and the second Subset-SD identifies that a corresponding packet is in the second plurality of packets.

2. The method of claim 1, comprising:
a second network node of the plurality of other network nodes receiving the first packet subsequent to the first network node said multicasting the first packet; and
based on the particular Tree-SID located in the Segment List of the first packet, the second network node sending the first packet in the network according to the SR-based multicast distribution tree which includes multicasting to a plurality of child network nodes in the network.

3. The method of claim 2, comprising:
maintaining topology information of the network by a controller;
determining a path of the multicast distribution tree identified by the particular Tree-SID through a plurality of network nodes of the network, with the plurality of network nodes including the first network node and the second network node;
the controller communicating forwarding information to each of the plurality of network nodes including to the first network node to cause the first network node to said multicast the first packet based on the particular Tree-SID located in the Segment List of the first packet and to the second network node to cause the second network node to said send the first packet in the network according to the SR-based multicast distribution tree.

4. The method of claim 1, comprising:

a second network node of the plurality of other network nodes receiving the first packet subsequent to the first network node said multicasting the first packet; and based on the particular Tree-SID located in the Segment List of the first packet, the second network node sending the first packet in the network according to the SR-based multicast distribution tree which includes unicasting to a single child network node in the network.

5. The method of claim 1, including: a source network node sending each of the plurality of packets to a root network node of the SR-based multicast distribution tree, with each sent packet of the plurality of packets said sent by the source network node including the particular Tree-SID in the Segment List of said sent packet.

6. The method of claim 1, comprising:

an edge network node of the SR-based multicast distribution tree receiving specific packets of the plurality of packets;

the edge network node forwarding to one or more subscribing nodes packets of said received specific packets based on an included corresponding Subset-SID.

7. The method of claim 6, wherein packets of said received specific packets including the first Subset-SID are forwarded to a different set of said subscribing nodes than packets of said received specific packets including the second Subset-SID.

8. The method of claim 6, wherein the first plurality of packets are initially sent from a first source network node different than a second source network node initially sending the second plurality of packets.

9. A method, comprising:

sending a plurality of packets in a network along a Segment Routing-based (SR-based) multicast distribution tree identified by a particular Tree Segment Identifier (Tree-SID) with the particular Tree-SID being a same global value used within the network to identify the SR-based multicast distribution tree, with each particular packet of the plurality of packets including the particular Tree-SID in a Segment List of said particular packet, with the Segment List comprising an ordered list of one or more SID's identifying information for forwarding said particular packet in the network, and with said sending the plurality of packets comprising:

a first network node receiving a first packet of the plurality of packets; and the first network node multicasting the first packet based on the particular Tree-SID located in the Segment List of the first packet, with said multicasting including forwarding the first packet from the first network node to a plurality of other network nodes in the network according to the SR-based multicast distribution tree;

wherein the first network node is a root of the SR-based multicast distribution tree; and wherein the method includes: a source network node sending each of the plurality of packets to the first network node, with each sent packet of the plurality of packets said sent by the source network node including the particular Tree-SID in the Segment List of said sent packet; and wherein each sent packet of the plurality of packets said sent by the source network node includes a SID associated with the first network node used in forwarding said sent packet from the source network node through the network to the first network node.

10. A method, comprising:

sending a plurality of packets in a network along a Segment Routing-based (SR-based) multicast distribution tree identified by a particular Tree Segment Identifier (Tree-SID) with the particular Tree-SID being a same global value used within the network to identify the SR-based multicast distribution tree, with each particular packet of the plurality of packets including the particular Tree-SID in a Segment List of said particular packet, with the Segment List comprising an ordered list of one or more SID's identifying information for forwarding said particular packet in the network, and with said sending the plurality of packets comprising:

a first network node receiving a first packet of the plurality of packets;

the first network node multicasting the first packet based on the particular Tree-SID located in the Segment List of the first packet, with said multicasting including forwarding the first packet from the first network node to a plurality of other network nodes in the network according to the SR-based multicast distribution tree; and a source network node sending each of the plurality of packets to a root network node of the SR-based multicast distribution tree, with each sent packet of the plurality of packets received by the root network node including a SID associated with the root network node used in forwarding said sent packet in the network to the root network node, with the root network node identifying the particular Tree-SID based on the SID associated with the root network node used in forwarding said sent packet from the source network node through the network to the root network node and the root network node adding the particular Tree-SID to the Segment List of said sent packet.

11. A method, comprising:

sending a plurality of packets in a network along a Segment Routing-based (SR-based) multicast distribution tree identified by a particular Tree Segment Identifier (Tree-SID) with the particular Tree-SID being a same global value used within the network to identify the SR-based multicast distribution tree, with each particular packet of the plurality of packets including the particular Tree-SID in a Segment List of said particular packet, with the Segment List comprising an ordered list of one or more SID's identifying information for forwarding said particular packet in the network, and with said sending the plurality of packets comprising:

a first network node receiving a first packet of the plurality of packets;

the first network node multicasting the first packet based on the particular Tree-SID located in the Segment List of the first packet, with said multicasting including forwarding the first packet from the first network node to a plurality of other network nodes in the network according to the SR-based multicast distribution tree; and a plurality of source network nodes sending packets aggregating to form the plurality of packets to a root network node of the SR-based multicast distribution tree, with each sent packet of the plurality of packets said sent by one of the plurality of network source nodes including the particular Tree-SID in the Segment List of said sent packet.

12. A method, comprising:
sending a plurality of packets in a network along a Segment Routing-based (SR-based) multicast distribution tree identified by a particular Tree Segment Identifier (Tree-SD) with the particular Tree-SID being a same global value used within the network to identify the SR-based multicast distribution tree, with each particular packet of the plurality of packets including the particular Tree-SID in a Segment List of said particular packet, with the Segment List comprising an ordered list of one or more SID's identifying information for forwarding said particular packet in the network, and with said sending the plurality of packets comprising:
a first network node receiving a first packet of the plurality of packets;
the first network node multicasting the first packet based on the particular Tree-SID located in the Segment List of the first packet, with said multicasting including forwarding the first packet from the first network node to a plurality of other network nodes in the network according to the SR-based multicast distribution tree;
maintaining topology information of the network by a controller;
determining a path of the multicast distribution tree identified by the particular Tree-SID through a plurality of network nodes of the network, with the plurality of network nodes including the first network node;
the controller communicating forwarding information to each of the plurality of network nodes including to the first network node to cause the first network node to said multicast the first packet based on the particular Tree-SID located in the Segment List of the first packet; and
the controller receiving a request to implement the multicast distribution tree identified by a particular Tree Segment Identifier (Tree-SD); and wherein said determining the path is performed in response to said receiving the request; and wherein the request includes design criteria; and wherein said determining the path avoids particular network nodes and links between network nodes that do not conform to the said design criteria.

13. A method, comprising:
receiving, by a first network node in a network, a plurality of packets, with each particular packet of the plurality of packets including a particular Tree Segment Identifier (Tree-SID) in a Segment List of said particular packet, with the Segment List comprising an ordered list of one or more SID's identifying information for forwarding said particular packet in the network, and with the Tree-SID identifying a particular Segment Routing-based (SR-based) multicast distribution tree in the network; and
multicasting, by the first network node, each particular packet of the plurality of packets based on the particular Tree-SID located in the Segment List of said particular packet, with said multicasting including forwarding said particular packet from the first network node to a plurality of other network nodes in the network according to the SR-based multicast distribution tree;
wherein the plurality of packets includes a first plurality of packets and a second plurality of packets, with each of the first plurality of packets including a first Subset-SD in the Segment List of each packet of the first plurality of packets, and with each of the second plurality of packets including a second Subset-SID in the Segment List of each packet of the second plurality of packets; wherein the first Subset-SID identifies that a corresponding packet is in the first plurality of packets and the second Subset-SID identifies that a corresponding packet is in the second plurality of packets.

14. The method of claim 13, wherein the first network node is a root of the SR-based multicast distribution tree.

15. A packet switching device, comprising:
a plurality of interfaces that send packets to, and receive packets from a network;
one or more network processors with associated memory; and
one or more packet switching mechanisms that packet switch packets among said interfaces;
wherein the packet switching device performs operations, including:
receiving a plurality of packets sent from a source network node in the network, with each of the plurality of packets including a Segment Identifier (SID) that is an address of the packet switching device;
for each specific packet of said received plurality of packets, in response to identifying a particular Tree-SID based on the SID, adding the particular Tree-SID to a Segment List of said specific packet, with the Segment List comprising an ordered list of one or more SID's identifying information for forwarding said particular packet in the network, and with the Tree-SID identifying a particular Segment Routing-based (SR-based) multicast distribution tree in the network;
multicasting each particular packet of the plurality of packets based on the particular Tree-SID located in the Segment List of said particular packet, with said multicasting including forwarding said particular packet from the packet switching device to a plurality of other network nodes in the network according to the SR-based multicast distribution tree;
wherein the packet switching device is a root network node of the SR-based multicast distribution tree.

16. The packet switching device of claim 15, wherein said operations include: receiving forwarding information from a controller external to the packet switching device; and programing said associated memory with said received forwarding information to cause the packet switching device to said multicasting each particular packet of the plurality of packets based on the particular Tree-SID.

* * * * *

UNITED STATES PATENT AND TRADEMARK OFFICE
CERTIFICATE OF CORRECTION

PATENT NO. : 10,158,558 B1
APPLICATION NO. : 15/410730
DATED : December 18, 2018
INVENTOR(S) : Ward et al.

Page 1 of 1

It is certified that error appears in the above-identified patent and that said Letters Patent is hereby corrected as shown below:

In the Specification

Column 2, Line 39, "perfoiming" should be -- performing --

Column 3, Line 17, "teim" should be -- term --

In the Claims

Column 8, Claim 1, Line 10, "(Tree-SD)" should be -- (Tree-SID) --

Column 8, Claim 1, Line 34, "Subset-SD" should be -- Subset-SID --

Column 8, Claim 1, Line 38, "Subset-SD" should be -- Subset-SID --

Column 11, Claim 12, Line 5, "(Tree-SD)" should be --Tree-SID --

Column 11, Claim 12, Line 37, "(Tree-SD);" should be -- (Tree-SID); --

Column 12, Claim 13, Lines 7-8, "Subset-SD" should be -- Subset-SID --

Signed and Sealed this
Third Day of September, 2019

Andrei Iancu
*Director of the United States Patent and Trademark Office*